March 27, 1934.    K. E. GOLDEN    1,952,588
APPARATUS FOR GENERATING AND APPLYING ELECTROSTATIC ENERGY
Filed Jan. 5, 1931    2 Sheets-Sheet 1
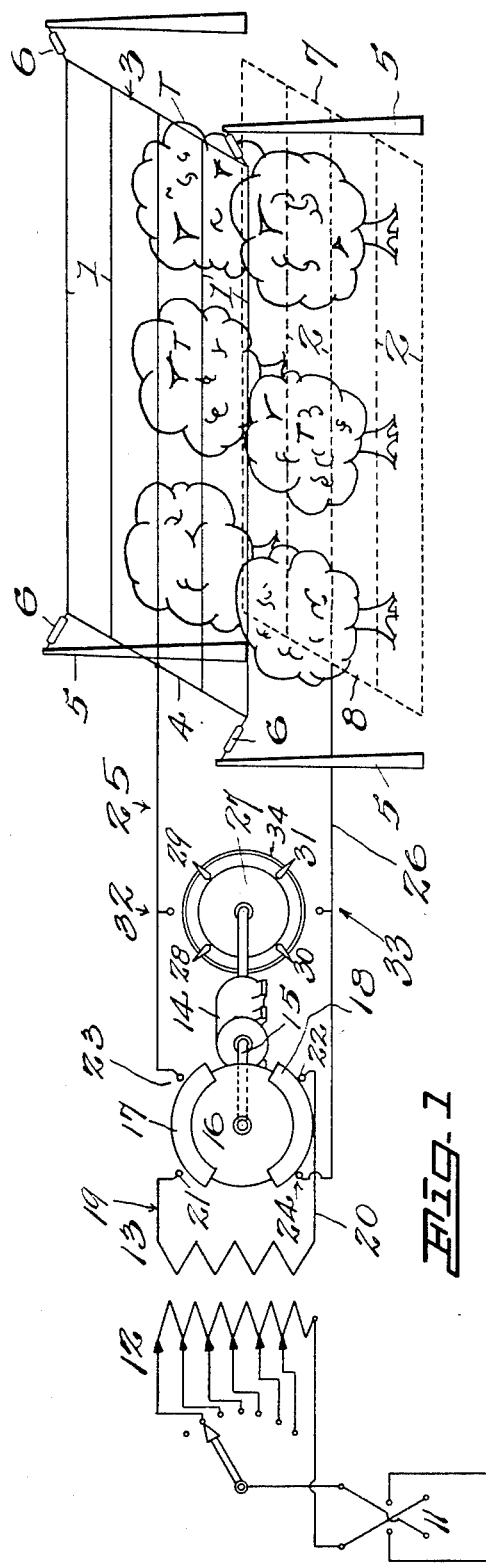
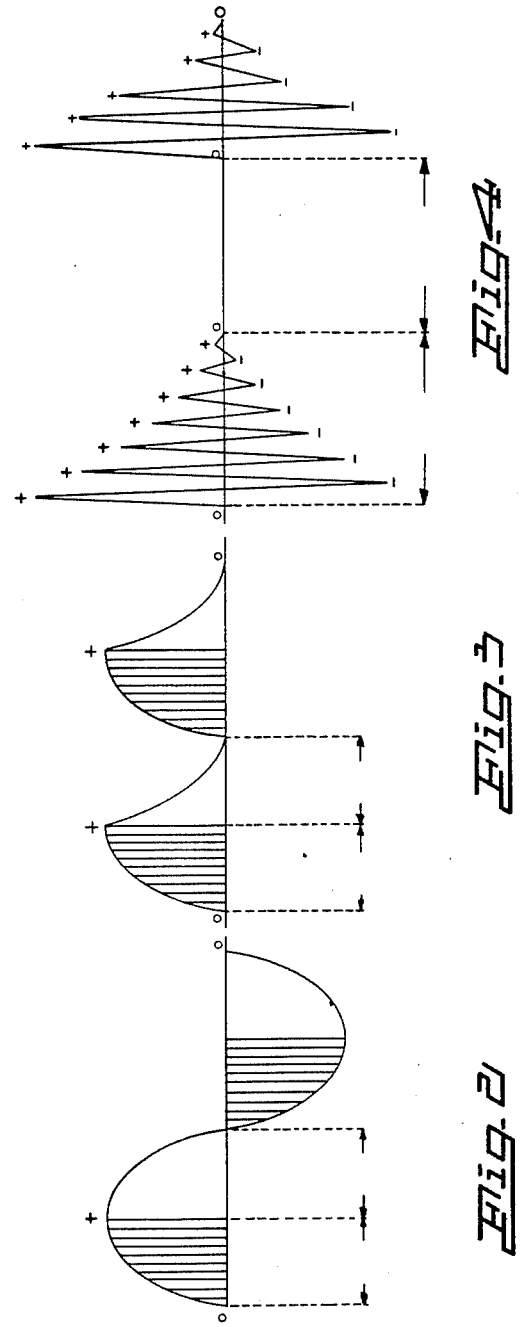
KENNETH E. GOLDEN
Inventor
By Herbert E. Smith
Attorney March 27, 1934.    K. E. GOLDEN    1,952,588
APPARATUS FOR GENERATING AND APPLYING ELECTROSTATIC ENERGY
Filed Jan. 5, 1931    2 Sheets-Sheet 2
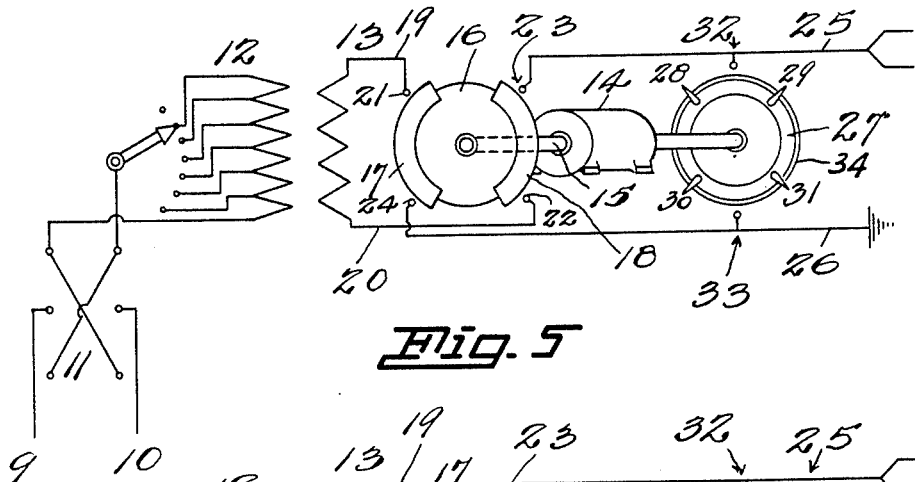
Fig. 5
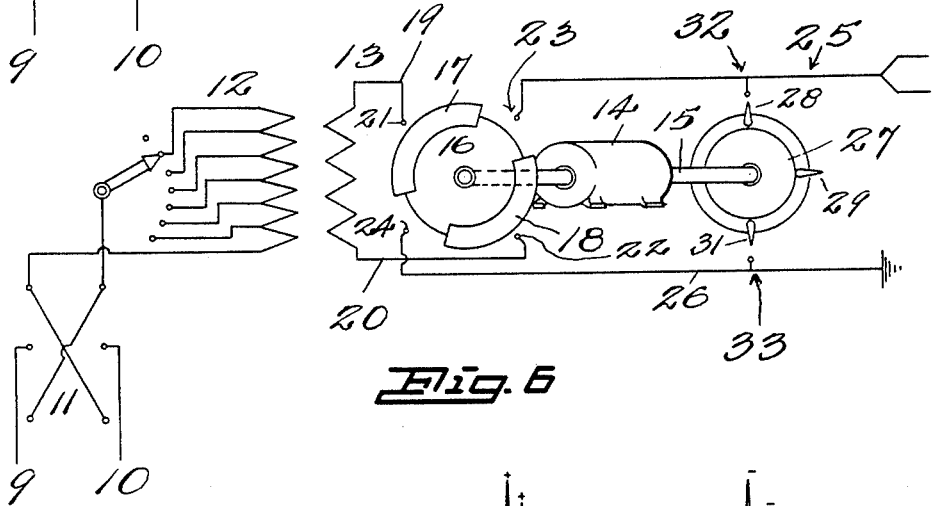
Fig. 6
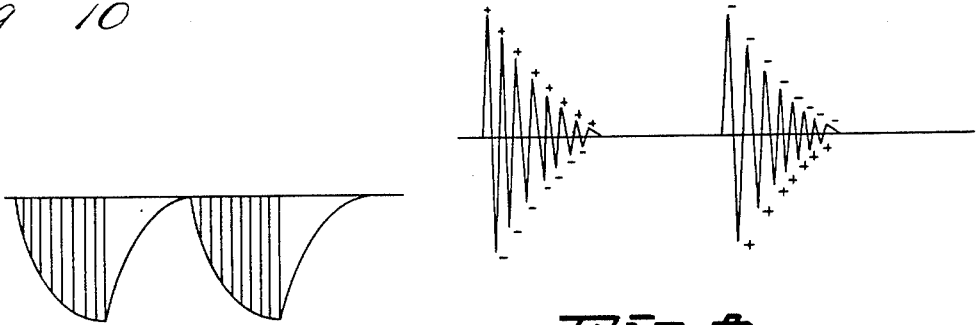
Fig. 7
Fig. 8
KENNETH E. GOLDEN
Inventor
By Hubert E. Smith
Attorney Patented Mar. 27, 1934

1,952,588

UNITED STATES PATENT OFFICE 1,952,588

APPARATUS FOR GENERATING AND APPLYING ELECTROSTATIC ENERGY

Kenneth E. Golden, Spokane, Wash., assignor to Ray-dio-Ray Corporation, Spokane, Wash.

Application January 5, 1931, Serial No. 506,786

2 Claims. (Cl. 175—311)

My present invention relates to an improved apparatus for generating and applying electrostatic energy, from which apparatus and its system of distribution, electric currents of high intensity, in the form of polarized, oscillating electrical discharges are delivered. In the system of distribution forming part of the apparatus, and from which the energy is utilized, I employ an antenna, aerial, or overhead network of wires, in spaced relationship to a complementary ground, or underground, system or network of wires. Between this upper and the lower system of wiring a gap is formed for the transmission of electrical energy, the overhead wires forming the applicator and the ground wires or underground wires forming the return circuit for the electrical energy. The aerial system or network receives a charge of electricity and the charge is amplified or built up to a predetermined intensity and then broken down at predetermined intervals of time, in order that the charges may pass from the aerial system to the ground system, as in the performance of the functions of an electrical condenser, and due to this arrangement of the discharge field and the return field, the necessity for use of a condenser is eliminated, thereby reducing the cost of manufacturing the apparatus, as well as the cost of maintenance of the apparatus.

The apparatus is adapted for various uses in agricultural engineering, in the treatment of foods and food products, and in animal and vegetable life, and as an example of the purpose and utility of the invention I have illustrated a portion of an orchard with the discharge field and the return field in proximity thereto, for the purpose of enhancing the productivity of the trees and increasing the value of the products.

The invention consists in certain novel combinations and arrangements of parts, as will hereinafter be more fully set forth and claimed, whereby an apparatus for this purpose is provided that is simple in construction and operation, composed of a minimum number of parts for securing a maximum of efficiency, and an apparatus that is comparatively inexpensive in cost of production and maintenance.

In the accompanying drawings I have illustrated one complete example of the physical embodiment of my invention wherein the parts are combined and arranged according to one mode I have thus far devised for the practical application of the principles of my invention.

Figure 1 is a diagrammatic view of the apparatus in position for use with an orchard.

Figure 2 is a sine curve of the electrical energy or input current to the transformer employed in the apparatus, the alternate plus and minus waves shown above and below the zero line, respectively.

Figure 3 is a curve or chart of the energy from the rectifier of the apparatus, showing a continuous set of positive waves above the zero line.

Figure 4 is a curve, strongly peaked, of the high frequency oscillations as generated in and discharged from the discharge field or aerial, and indicating a rapid diminution to the zero line.

Figure 5 is a diagrammatic view of the electrically operating parts of the apparatus showing the position during the charging interval, and Figure 6 is a similar view showing the position of parts during the discharging period.

Figure 7 is a curve or chart of the negative wave from the rectifier, showing a continuous polarity of waves below the zero line as distinguished from the curve of Figure 3.

Figure 8 shows the curves of waves as generated in an ordinary alternating discharge, where the wave train is first positive and then negative at the sides of the zero line, as distinguished from Figure 4 where each succeeding wave shows the positive curve above the zero line and the negative curve below the zero line.

In the assembly view of Figure 1, where one exemplification of the invention is illustrated, I have shown a number of trees T, as in an orchard, which are to be treated with the electrical discharges from the discharge field that is arranged in proximity to the upper parts of the trees and composed of a suitable number of wires 1 arranged in parallelism. On the ground or under the ground is arranged a return field comprising complementary, parallel wires 2, shown by dotted lines, and these conductors 1 and 2 are fashioned of suitable metal as copper or aluminum strands formed in cables.

The parallel wires of the discharge field are connected at their ends to the cross conductors 3 and 4 to form a rectangular discharge field or aerial that is supported from the four corner posts 5, and insulated as at 6 from the posts, to provide an insulated discharge field or aerial.

The conductors 2 of the return field or ground system are connected at their ends to the end wires 7 and 8, which as before stated may be beneath the ground surface or on the ground, but in any case the discharge field and the return field are spaced apart or separated sufficiently to insure the discharge of electrical currents from the discharge field, the transmission of these currents through the gap between the two fields and in proximity to the trees, and the reception of the currents to the return field or ground connection of the applicator system.

The electrical operating mechanism is connected with the power house by wires 9 and 10, and a pole changing or polarity reversing switch 11 is interposed in the line wires which lead to the step up transformer in which the primary winding is indicated at 12 and the secondary winding at 13. The transformer may be of any suitable type, as a closed-core transformer utilizing a current of 120 to 220 volts of alternating current, and the transformer produces a high voltage of 60,000 volts, more or less.

A synchronous motor 14 is utilized in the operating circuit, which motor rotates its shaft 15 at approximately 1800 revolutions per minute; and on one end of the shaft is mounted the disk 16 of a rectifier carrying the diametrically arranged arcuate-shaped rectifying plates 17 and 18 forming the electrodes.

The secondary winding 13 of the step up transformer is connected by wires 19 and 20 respectively to the terminals 21 and 22 of the rectifier disk, and complementary terminals 23 and 24 of the rectifier are connected by wires 25 and 26 to the discharge field and the ground field previously described, and shown in Figure 1.

On the opposite end of the motor shaft 15 is mounted a rotary discharge disk 27, upon which are mounted the four diametrically arranged, and equally spaced contacts 28, 29, 30, and 31, for coaction with the stationary contacts or points 32 and 33 of the wires 25 and 26, respectively, in making and breaking the discharge circuit.

This sparking arrangement serves to short circuit and discharge the condenser system 1, 2, after it is charged, and the function of the sparking arrangement is to synchronously discharge the electric charge placed between the net work 1, 2, at the rate of 120 times per second, which is the charging rate of the impulses delivered from the rectifier terminals 23 and 24.

The wave shape of these impulses is shown in Figures 3 and 7, and as there are 120 of these impulses per second, there will consequently be 120 charges consumed each second, in which each charge is discharged between the points 32 and 33 and any two points on the disk 27 as they move in line with the points 32 and 33.

The rectifier disk 16 and the discharge disk 27 revolve with the motor shaft 15, and the operation of these disks is based upon an exact cut off or timing period, and in the arrangement illustrated the transformer 12—13 is in balance with the discharge field or aerial and the return field, similar to the arrangement of a condenser with the transformer. But in the equipment and installation of the apparatus of my invention, a condenser is dispensed with, thereby reducing the cost of manufacture, installation, and maintenance of the apparatus.

The rectifying system is employed to convert alternating current from the transformer-secondary 13 to a unidirectional current consisting of spaced impulses of the same polarity, and thus each charge to the net work or antenna will be of the same sign as each preceding charge. If each preceding charge be positive, the oscillation produced will contain a greater positive potential, due to the fact that the greater portion of the charge is expended in the first wave of the discharge, and as the first wave collapses to zero, there will be a following wave of a reversed polarity, which is negative. But this negative wave will be of a much less force than the preceding positive wave, and therefore the positive element in the oscillation will rule over the negative.

The spark discharging disk 27 is equipped with an annular conductor or balance strip 34, and this disk revolves in proximity to the two points or electrodes 32 and 33 of the feed wire 25 and the ground or return wire 26 respectively, to provide the spark gap.

The strip 14 is a connecting strip for interconnecting the discharge points 28, 29, 30, 31, in order to make a complete connection for the discharge, from the points 32 to 33, through the rotor points 28 and 31, or 29 and 30, mounted on the disk 27.

By use of the switch 11 the instantaneous polarity is reversed in the transformer primary-winding 12, which reverses the instantaneous polarity in the secondary-winding 13, and therefore the selector, or rectifying switch 16, will select and convert the voltage waves or loops of the opposite polarity to the converted polarity before the reversal of the switch. Therefore the net work or antenna will be charged with a potential of an opposite polarity, as before the switch was reversed, and accordingly the major portion of the oscillation produced will be of the latter polarity. Thus, if the polarity of the charge be positive, the action of the oscillation produced through discharge will be to stimulate; and if the polarity be opposite, i. e. negative, the oscillation produced will have a negative or retarding effect on vegetation as well as an increased lethal effect on the insect eggs, through which this oscillation flows.

A high potential, high frequency oscillation or electro-static, uni-polar discharge may be accomplished from the discharge field, to stimulate vegetation or the growth of the trees T, or by reversing the switch 11, an electric discharge is accomplished from the discharge field that will destroy certain animal life within the zone of influence of the discharge, as for instance insects, worms, fertile eggs etc.

I have found by test that by reversing the charge from positive to negative on the antenna or net work 1, the excessive negative influence from the oscillation produced between the antenna and the ground has a tendency to tear down or disintegrate the cell structure of insects, or eggs of insects, but this negative influence has very little stimulating effect on vegetation through which the oscillation flows.

The charge is unipolar to the antenna and trees in Figure 1, and it becomes bipolar when the charge is discharged at the sparking arrangement 27, whereupon the oscillation takes the form as indicated in Figure 4.

The discharge field or aerial, together with the return field or ground field may have, as an example, a capacity of .005 micro-farads, corresponding to the capacity required by the discharge device or transformer 12—13, in order that the parts may operate in perfect synchronism, thereby preventing loss of electrical energy when the apparatus is operating at maximum capacity.

Figure 4 discloses the shape of the oscillating, high frequency wave generated, and discharged from the discharge field, the sparking disk 27 providing the spark across the gap from the discharge field to the return field, and the waves generated show a rapid diminution to zero with a pause or rest between waves, that is, the wave length according to 60 cycle generation is 1/240 of a second, and the alternating pause is 1/240 of a second.

The discharge field thus becomes a capacity applicator, and, with the ground or return field, is capable of being charged with a high potential uni-polar or an alternating current that may be discharged periodically, or at the will of the operator, by the formation of the discharger that is selectively synchronous, or non-synchronous. When completely charged, the applicator discharges its stored up energy across the gap from the discharge field to the return field, thereby setting up a high frequency oscillation which is very highly damped. This oscillatory discharge is believed to induce a vibratory wave upon the vegetation, and when a certain band of frequency is used, causes plant resonance, or a like vibration in the plant cells.

The antenna 1 and the ground system 2 constitute plates, forming a huge condenser. When a charge is placed between the antenna and the ground system and is discharged through the gap at 27, a high frequency oscillation is set up, and the period of this oscillation is governed by the distributive capacity of the entire antenna and line 25 connecting the antenna to the rotary gap and ground system, and including the inductance of this antenna and line connecting the rotary gap and ground system.

As the frequency, or wave lengths, of this oscillatory circuit is governed by the amount of capacity and inductance in that complete circuit, I therefore govern the physical and electrical size of the antenna and of the ground system, and thus produce any frequency desired for various treatments applied to vegetation between the antenna and the ground system.

The oscillatory discharge, created across the gap 27, flows through the antenna, and oscillates across the space between the antenna and the ground system, being thus applied to the vegetation located between the parts 1 and 2.

The frequency of the uni-polar current of high potential, polarized oscillation, is believed to be controlled by the size or area of the discharge field, and its distance from the ground circuit or ground field, or the frequency may be changed by placing in series with the discharge field and transmission line 25, an inductance of suitable value that is necessary to generate the frequency that will synchronize with the natural period of vibration of cells in the vegetation, or of insect eggs.

The cells of vegetation I find by practice of my invention, will respond to a wide range of frequencies, ranging from 75,000 to 300,000, and the cells of plants or vegetation I believe require a much lower period of vibration than the cells of animal life or insect eggs.

Having thus fully described my invention, what I claim as new and desire to secure by Letters Patent is:—

1. An electrical apparatus for treating different forms of life between a discharge field and a return field forming a condenser, a transformer and a rectifier connected in circuit with said fields, and a rotary discharger between the rectifier and the fields.

2. In a system for applying high potential polarized high frequency oscillations, including an aerial discharge field and a spaced ground field performing the functions of a condenser, a feed wire for the discharge field and a return wire for the ground field, a pole changing switch and a transformer, a rectifier connected with said wires, and a rotary charging device between the rectifier and said fields.

KENNETH E. GOLDEN.